US006735622B1

(12) United States Patent
Andreoli et al.

(10) Patent No.: US 6,735,622 B1
(45) Date of Patent: May 11, 2004

(54) TRANSFERRING CONSTRAINT DESCRIPTORS BETWEEN LIGHT-WEIGHT DEVICES FOR DOCUMENT ACCESS

(75) Inventors: Jean-Marc Andreoli, Meylan (FR); Uwe M. Borghoff, Hoehenkirchen (DE)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/421,752

(22) Filed: Oct. 20, 1999

(30) Foreign Application Priority Data

Apr. 23, 1997 (GB) ............................................. 9708172
Apr. 23, 1997 (GB) ............................................. 9708175

(51) Int. Cl.$^7$ ............................................. G06F 15/16
(52) U.S. Cl. ........................ 709/219; 709/203; 345/744; 345/839; 707/4; 707/10
(58) Field of Search ................................. 709/200, 201, 709/203, 217–219; 707/1.2, 4.8, 10, 104, 501, 516; 345/700, 733, 744, 748, 839

(56) References Cited

U.S. PATENT DOCUMENTS

| | | | | |
|---|---|---|---|---|
| 5,404,294 A | * | 4/1995 | Karnik ........................ | 707/507 |
| 5,428,735 A | * | 6/1995 | Kahl et al. ................... | 345/839 |
| 5,428,776 A | * | 6/1995 | Rothfield ...................... | 707/4 |
| 5,655,116 A | * | 8/1997 | Kirk et al. ..................... | 707/1 |
| 5,721,897 A | * | 2/1998 | Rubinstein ..................... | 707/2 |
| 5,794,233 A | * | 8/1998 | Rubinstein .................... | 707/10 |
| 5,826,258 A | * | 10/1998 | Gupta et al. ................... | 707/10 |
| 5,963,949 A | * | 10/1999 | Gupta et al. ................. | 707/100 |
| 6,166,734 A | * | 12/2000 | Nahi et al. ................... | 345/748 |

FOREIGN PATENT DOCUMENTS

EP   0 691 619 A2   1/1996

OTHER PUBLICATIONS

Andreoli, Jean–Marc et al. "Constraint Agents for the Information Age," Journal of Universal Computer Science, vol. 1, No. 12, Dec. 1995, pp. 762–789.

Andreoli, J.M. et al. :The Constraint–Based Knowledge Broker Model: Semantics, Implementation and Analysis, Journal of Symbolic Computation, vol. 21, No. 4, 1996, pp. 635–676.

* cited by examiner

*Primary Examiner*—Wen Tai Lin
(74) *Attorney, Agent, or Firm*—Oliff & Berridge, PLC

(57) ABSTRACT

Information about documents is transferred between machines in the form of constraint descriptors. A first machine can obtain a constraint descriptor that includes information about a set of constraints that documents can satisfy. The first machine can transfer the constraint descriptor to a second machine that is capable of using the constraint descriptor to access documents that satisfy the set of constraints. Similarly, the second machine can receive a data packet from the first machine, where the data packet includes an encoding of the constraint descriptor. The second machine can decode the data packet to obtain the constraint descriptor. Each of the machines can be a portable computing device or a fixed computing device. The first machine can receive user signals through its user interface, defining an attribute-value relation, and the first machine can compile a constraint using the user signals. Or the first machine can receive user signals selecting a stored constraint descriptor. In response to user signals, is the second machine can solve the set of constraints and can use the solution to obtain document references, such as Web URLs, indicating documents that satisfy the set of constraints. The user can then request more detail, or can obtain a printed version of a document.

20 Claims, 12 Drawing Sheets

| k bytes | l bytes | m bytes | n bytes | o bytes | p bytes |
|---------|---------|---------|---------|---------|---------|
| Preamble | Destination Address | Source Address | Type Field | Data Field | CRC |

*FIG. 8*

TRANSFERRING CONSTRAINT DESCRIPTORS BETWEEN LIGHT-WEIGHT DEVICES FOR DOCUMENT ACCESS

This application claims priority under 35 U.S.C. §120 from copending International Applications PCT/IB98/00757 and PCT/IB98/00758, both filed 23 Apr. 1998, with respect to all shared subject matter. International Application PCT/IB98/00757 in turn claimed priority from Great Britain Application No. 9708175.6, filed 23 Apr. 1997, and International Application PCT/IB98/00758 in turn claimed priority from Great Britain Application No. 9708172.3, filed 23 Apr. 1997. WO-98/48359, the published version of International Application PCT/IB98/00757, and WO-98/48361, the published version of International Application PCT/IB98/00758, are both incorporated herein by reference in entirety.

FIELD OF THE INVENTION

The invention relates to techniques that transfer information about documents between machines.

BACKGROUND

Flynn et al., EP-A-691 619 ("Flynn"), describe a system for accessing and distributing electronic documents. The system can include any number of workstations, file servers, printers, and other fixed devices such as copiers, fax machines, and multifunction devices, all coupled in a network. The system can also include a number of portable devices, such as handheld or wristwatch computers, that can be carried by users and coupled to the network by infrared (IR) link. Each portable device can emulate its user's personal satchel for documents: The device can be programmed to receive, transmit, and store document references or tokens, such as Web URLs, each of which is associated with an electronic document stored in a database on the network. A document can be distributed from one user's portable device to another's by transmitting the document's URL, and a document can similarly be sent to a fixed device such as a printer by beaming the document's URL to an IR transceiver associated with the device.

Andreoli, J.-M., Borghoff, U. M., Pareschi, R., and Schlichter, J. H., "Constraint Agents for the Information Age", *Journal of Universal Computer Science*, Vol. 1, No. 12, December 1995, pp. 762–789, describe constraint-based knowledge brokers which are concurrent agents that use signed feature constraints to represent partially specified information and can flexibly cooperate in the management of distributed knowledge.

Andreoli et al. disclose an operation named "scope-splitting", which relies on the use of negation. Under scope-splitting, a broker can split its scope, creating two brokers. In contrast with a basic feature constraint (BFC), which cannot include negation or disjunction, a signed feature constraint (SFC) is composed of a positive part and a list of negative parts, both of which are basic feature constraints. If the scope of a broker is represented by an SFC and the scope is split by a BFC, the two resulting split scopes can both be represented by SFCs. In an example, a database of documents by non-American authors about art can be split by a constraint "books written after 1950" into art books written after 1950 but not by an American author and art documents not authored by an American but not books subsequent to 1950.

Andreoli et al. also disclose techniques for solving SFCs. Constraint satisfaction over BFCs is defined by conditional rewrite rules, as is conventional. Given an SFC, its positive component is first normalized by the algorithm for BFCs. If the result is a contradiction, the SFC is unsatisfiable. But otherwise, the normalized positive component is inserted into each of the negative components, which are then normalized by the algorithm for BFCs. If a resulting negative component has a contradictory normal form, it is eliminated, but if it has a tautological normal form, the SFC is unsatisfiable. The SFC is thus satisfiable if and only if its normal form is not reduced to a contradiction. Andreoli et al. disclose an implementation in which the SFC solver is realized as a list-transforming algorithm with additional checks for constraint satisfaction.

Andreoli et al. also disclose that a set of initial brokers can be provided, each with predefined scope. In processing requests, new brokers and agent specialists are cloned to handle a subset of their parent scope. In responding to follow-on requests, answers from existing specialists can be used, and the scope splitting mechanism avoids redundant work. Complex requests require interactions with many other agents and information stored in the network. In large information networks, such as the World Wide Web ("WWW" or "the Web"), the reuse of generated and already collected information is especially important.

SUMMARY OF THE INVENTION

The invention addresses problems that arise in transferring information relating to documents between machines, especially between portable computing devices that communicate through infrared links or other low bandwidth channels.

While the use of portable computing devices is becoming more widespread, storage capacity limitations make it impossible for such a device to store the electronic files for all the documents that a typical user may wish to access. Furthermore, the transfer of bulk documents between such devices or between one such device and a desktop computer or other non-portable computing device may be time consuming or difficult for the typical user. Meanwhile, the number of electronic document repositories is growing and document transfer via the Internet is expanding.

Although the system described by Flynn, above, addresses this situation, the Flynn techniques are problematic in several ways.

One problem is that Flynn's system stores and distributes references such as WWW URLs only for individual documents: Each document reference points to or links to a particular document. Flynn's system does not provide references for groups of documents.

Another problem with the Flynn techniques is how to keep track of a continually changing electronic document repository. Document descriptions can change, through updated author lists, updated dates, updated keywords, and so forth, requiring dynamic adjustments. In the Flynn system, however, a user may carry a URL for document A written by author B on the subject of topic C. Unknown to the user, updated document A' by author B may exist, written two years after A and on the same topic C. Or there may be a further document A" by author B and on a subject closely related to topic C, perhaps having a keyword in common. Even though A' and A" would be of use to the user, the user does not have references to them and could only obtain references through a further searching or browsing exercise to find and retrieve their URLs. The user is likely to continue working oblivious to the existence of A' and A".

These and similar problems with conventional techniques for transferring document-related information between machines are referred to herein as "document transfer problems".

The invention alleviates document transfer problems by providing techniques that transfer constraint. descriptors for documents. A constraint descriptor includes information about a set of one or more constraints that documents could satisfy. Instead of referring or pointing to a single document or to a static set of documents, a constraint descriptor implicitly refers to a set of documents that satisfy the set of constraints. The constraint descriptor can therefore be used to obtain documents in this set, even though the set may be dynamic in the sense that it changes as features of documents change.

The new techniques avoid the lack of dynamicity of existing systems and enable users to hold pointers to a set of documents that may be dynamically changed.

The new techniques can be implemented in methods for transferring information about documents between machines. In general, the methods can involve a transfer of a constraint descriptor from a first machine to a second machine.

A first method implementing the new techniques can operate the first machine to obtain a constraint descriptor that includes information about a set of constraints that documents can satisfy. The first method can then operate the first machine to transfer the constraint descriptor to a second machine that is capable of using it to access documents that satisfy the set of constraints.

In the first method, the first machine can include user interface circuitry for receiving user signals. In obtaining the constraint descriptor, the first machine can receive a series of user signals that define a relation between a document related attribute and a set of at least one value of the attribute. The first machine can use the series of user signals to compile a constraint that includes the relation. The series can, for example, include two or more user signals.

The first machine can be a portable computing device with a touchscreen or keyboard. Or it can be a fixed computing device with one or more of a touchscreen, keyboard, and mouse. The first machine can be a multifunction device with a scanner, and the user signals can be received by scanning an image bearing medium, such as a form with fields a user can mark to indicate values of an attribute.

The user interface circuitry can include display circuitry and selection circuitry to provide signals indicating, graphical objects in images presented by the display circuitry. The constraint descriptor can be stored in memory. An image can be presented that includes a graphical object representing the constraint descriptor. In response to a user signal indicating the graphical object, the stored constraint descriptor can be obtained.

The first machine can receive a user signal through user interface circuitry requesting that the constraint descriptor be sent to the second machine. In response, the first machine can encode the constraint descriptor in a data packet and transmit it to the second machine.

A second method implementing the new techniques can operate the second machine to receive from the first machine a data packet that includes an encoding of the constraint descriptor as described above. Then the second method can operate the second machine to decode the data packet to obtain the second descriptor. The second machine can be capable of using the constraint descriptor to access documents that satisfy the set of constraints.

In the second method, the second machine can be connected through a network for accessing a repository of electronic documents. The second method can include solving the set of one or more constraints to obtain a solution and then using the solution to obtain document references, each indicating an electronic document in the repository that satisfies the first constraint.

The second machine can include user interface circuitry with display circuitry and selection circuitry. The second method can present an image through that includes an item representing each document reference through the display circuitry. In response to a user signal through the selection circuitry indicating an item representing one of the document references, the second method can retrieve the indicated electronic document. The second method can present the electronic document through the display circuitry or operate printing circuitry to print it.

The new techniques can also be implemented in machines. In general, a first machine can transfer information about documents to other machines, while a second machine can receive information about documents from other machines.

The first machine can include a processor and communicating circuitry for providing communication between the processor and other machines. The processor can operate to obtain a constraint descriptor as described above and to transfer the constraint descriptor to one of the other machines through the communicating circuitry.

The first machine can be a portable computing device with user interface circuitry for providing user signals. The processor can obtain and transfer the constraint descriptor in response to a user signal.

Or the first machine can be a fixed computing device that transfers the constraint descriptor to a repository of electronic documents and receives document references. The first machine can also include image presentation circuitry for presenting an image that includes representations of the document references.

The second machine can similarly include a processor and communicating circuitry for providing communication between the processor and other machines. The processor can operate to receive a data packet from one of the other machines through the communicating circuitry. The data packet can include an encoding of a constraint descriptor as described above. The processor can further decode the data packet to obtain the constraint descriptor.

The second machine can be a portable computing device with user interface circuitry for providing user signals. The user interface circuitry can include display circuitry and selection circuitry as described above. The processor can store the constraint descriptor in memory and present an image that includes an item representing the stored constraint descriptor. In response to a user signal indicating the item, the processor can retrieve the stored constraint descriptor and solve the set of constraints to obtain a solution, which the processor can use to obtain document references.

Or the second machine can be a fixed computing device, again with user interface circuitry that includes display circuitry and selection circuitry. The processor can solve the set of constraints to obtain a solution, can use the solution to obtain document references, and can present an image that includes an item representing each document reference. In response to a user signal indicating an item representing a selected document reference, the processor can access the selected document reference.

The new techniques are advantageous because they permit transfer of information relating to a dynamic set of documents. For example, if a set of constraints includes only a constraint on author name, e.g. Smith, and a constraint on document date, e.g. after 1995, then the set of constraints will be satisfied by any document authored by an author named Smith in a year later than 1995. When, in 1998, an individual named Smith authors another document, the document satisfies the set of constraints, and automatic operations to identify and retrieve documents satisfying the constraints will obtain document references pointing to or linking to the document, without further user intervention.

Some of the new techniques are further advantageous because they permit transfer of document references between portable devices of different users who are in a meeting at a remote location or otherwise away from their office workstations. If a sender knows a set of constraints that an existing document satisfies or if a constraint descriptor for such a set is stored in the sender's portable device, the sender's portable device can transfer a constraint descriptor to the recipient's portable device. For example, the sender might remember one or more of the author's name, a date or range of dates of creation, a keyword, or other values for the document's attributes, and thus be able to obtain a constraint descriptor. When the recipient subsequently returns to his or her office, the constraint descriptor can be transferred to the recipient's office workstation. Then the recipient can use the constraint descriptor to retrieve the document, as well as other documents that satisfy the set of constraints. This scenario does not require that the document's URL be stored on the sender's portable device or that the sender recall how to identify the document sufficiently to provide the document's URL—all it requires is a constraint descriptor that can be transferred between the portable devices.

The following description, the drawings, and the claims further set forth these and other aspects, objects, features, and advantages of the invention.

BRIEF DESCRIPTION OF THE DRAWINGS

FIG. 8 is a schematic illustration of a data packet in which a constraint is encoded.

DETAILED DESCRIPTION

A. Conceptual Background

Figure 1:
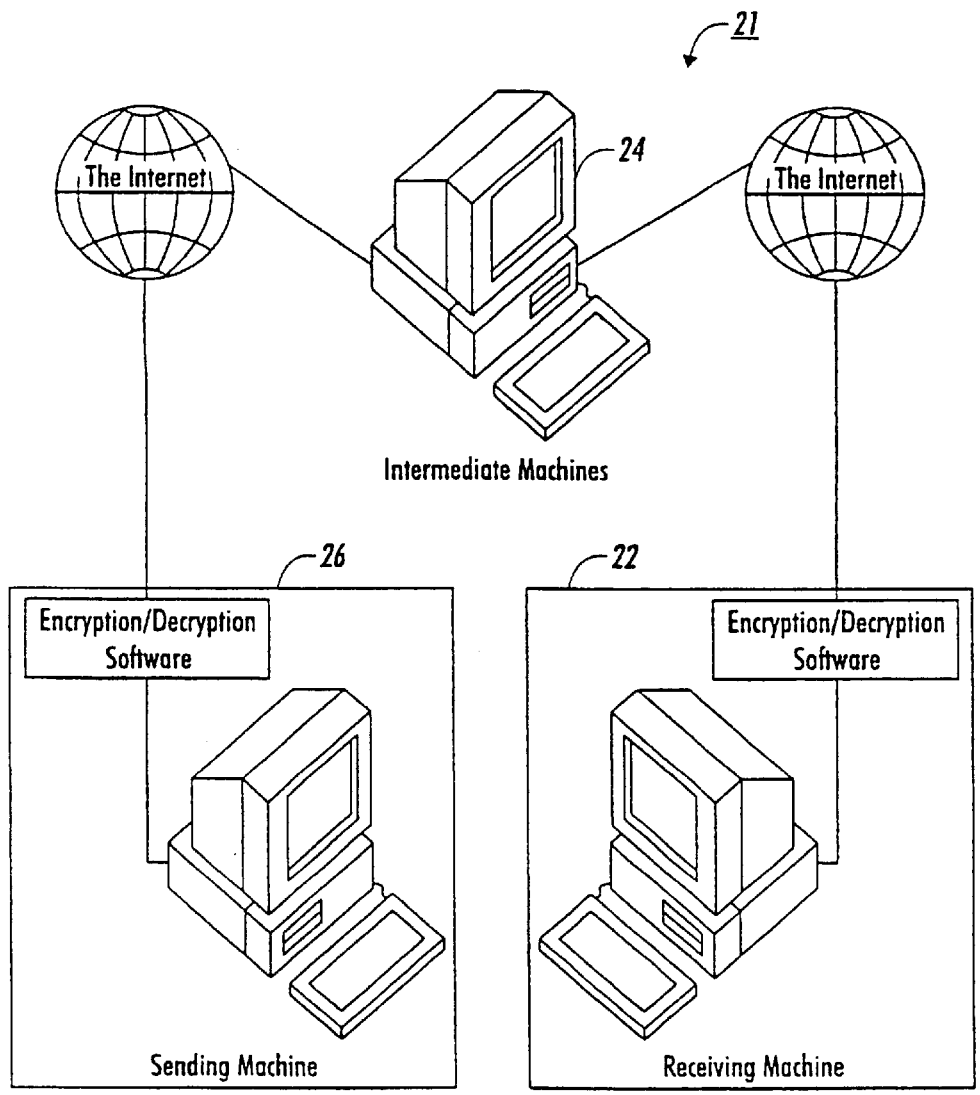
FIG. 1 is a schematic circuit diagram showing a network through which constraint descriptors could be transferred.

The following definitions are helpful in understanding the broad scope of the invention, and the terms defined below have the indicated meanings throughout this application, including the claims.

A "processor" or "processing circuitry" is a component of circuitry that responds to input signals by performing processing operations on data and by providing output signals. A processor may include one or more central processing units or other processing components. A processor can be a general purpose processor or a special purpose processor.

A "portable computing device" is a device that includes at least a processor and input/output circuitry and can be moved from place to place without difficulty.

A "fixed computing device" is a device that includes at least a processor and input/output circuitry and is not a portable computing device.

A processor or processing circuitry performs an operation or a function "automatically" when it performs the operation or function independent of concurrent human intervention or control.

A "user interface" or "user interface circuitry" is circuitry that can provide signals from a user. A user interface can, for example, include display circuitry for presenting images to a user and selection circuitry for providing user signals indicating items in the images. A user interface could include a scanner that produces electronic signals that include user signals, such as user markings in a field of a form.

Any two components are "connected" when there is a combination of circuitry that can transfer signals from one of the components to the other. For example, two components are "connected" by any combination of connections between them that permits transfer of signals from one of the components to the other.

A "network" is a combination of circuitry through which a connection for transfer of data can be established between machines. An operation "establishes a connection over" a network if the connection does not exist before the operation begins and the operation causes the connection to exist.

Any two components "communicate" when signals are transferred from one of the components to the other. Therefore, "communicating circuitry" is circuitry in a component that provides communication between the component and one or more other components. In addition to circuitry that provides direct connection or connection through a network, communicating circuitry can include transmitters and receivers for electromagnetic waves or other signals that do not require connections.

A "data packet" is an item of data that communicating circuitry can use to communicate, by converting a data packet into signals at a sending component and by extracting a data packet from :signals at a receiving component.

In a very broad sense, a "document" is an object from which information can be extracted that can be understood by a human, possibly after decoding or other processing of the object. An "electronic document" is a document in an electronic form, such as when being stored in memory circuitry or when being transmitted between machines by communicating circuitry, even though the medium of communication may not itself be electronic.

A "document repository" is a component within which electronic documents may be stored for subsequent access and retrieval.

A "document reference" is an item of data that can be used to access a specific document stored by a document repository, and may be said to "indicate" or "identify" the document. Web URLs and other unique identifiers of documents are examples of document references.

To "obtain" or "produce" an item of data is to perform any combination of operations that begins without the item of data and that results in the item of data. To obtain a first item of data "based on" a second item of data is to use the second item to obtain the first item.

The notions of "constraint" and "satisfy" are related: A constraint is a condition that, when met, is satisfied. A "constraint that documents can satisfy" is therefore a condition that could be met by a document. A constraint can be a logical combination of constraints, such as a conjunction of a set of subconstraints, in which case the constraint "includes" the subconstraints. For example, constraints that documents can satisfy may be expressed as logical combinations of simpler constraints such as attribute-value relations, where each attribute-value relation is between an attribute that a document could have and a set of at least one value of the attribute. A constraint is "inconsistent" if it cannot be met because of its logical structure; if inconsistency of a constraint can be determined from logical structure, it is unnecessary to search or check whether a document can be found that meets the constraint—no document could possibly it meet it. A constraint that is not inconsistent is "satisfiable" even though it may not in fact be satisfied by any stored document.

A "constraint descriptor" is an item of data that defines a constraint. A "document constraint descriptor" is a constraint descriptor defining a constraint that is applicable to documents.

An operation "compiles" a constraint if it operates on one or more items of data that provide information about a constraint to obtain a constraint descriptor that defines the constraint.

A "solution" of a constraint or a set of constraints is an item of data that indicates whether the constraint or set of constraints is inconsistent or satisfiable and, if satisfiable, indicates a less redundant version that is equivalent to the constraint or set of constraints. In this context, the solution is "equivalent" to the constraint or set of constraints if the solution can only be satisfied if the constraint or set of constraints is satisfied and vice versa.

An operation "solves" a constraint or a set of constraints if it obtains a solution of the constraint or set of constraints.

B. System

The invention can be implemented using conventional computing devices with communication provided by conventional computer network technology, such as a local area network (LAN), a wide area network (WAN), or other appropriate technology. The invention has been successfully implemented using conventional Web browser software, such as Netscape Navigator, to provide cross-platform communication and document transfer over the Internet. The implementation employs a type of constraint descriptors referred to herein as "feature constraints", described in greater detail below.

FIG. 1 illustrates schematically network 21, in which the Internet transfers is feature constraints between machines 22, 24, and 26. Each machine could be any conventional computing device connected to the Internet, such as a PC running Windows, a Mac running MacOS, or a minicomputer or other machine running Unix. Other system configurations could be employed, such as those described by Flynn et al., above, and other network configurations could be employed, including those described in EP-A-772,857 and U.S. Pat. No. 5,692,073. In general, each of the computing devices connected to network 21 can include user interface circuitry for receiving user signals, a processor whose operations are responsive to the user signals, and memory for storing data. The user interface circuitry can, for example, include display circuitry such as circuitry to present images on a CRT, LCD, or other display device. The user interface circuitry can also include selection circuitry for receiving signals indicating items in images presented by the display circuitry, such as circuitry to receive signals from a keyboard, mouse, touchscreen sensor, joystick, or other such device.

In response to a request from a user at receiving machine 22, a document stored on sending machine 26 can be retrieved and sent over the Internet to receiving machine 22, via one or more intermediate machines 24. As is well known, a document accessible through the Web can be retrieved using as a unique identifier its Web URL, as described by Flynn et al., above. As further described by Flynn et al., additional devices of various types can be connected to network 21, including scanners, printers, copiers, and multifunction devices capable of scanning, printing, faxing, etc., described, for example, in EP-A-741,487. Each machine connected to network 21 can also be equipped with appropriate hardware and software for communication with portable computing devices, such as conventional hardware and software for communication with personal digital assistants (PDAs), handheld PCs, pocket or wristwatch computers, or other portable computers.

Figure 2:
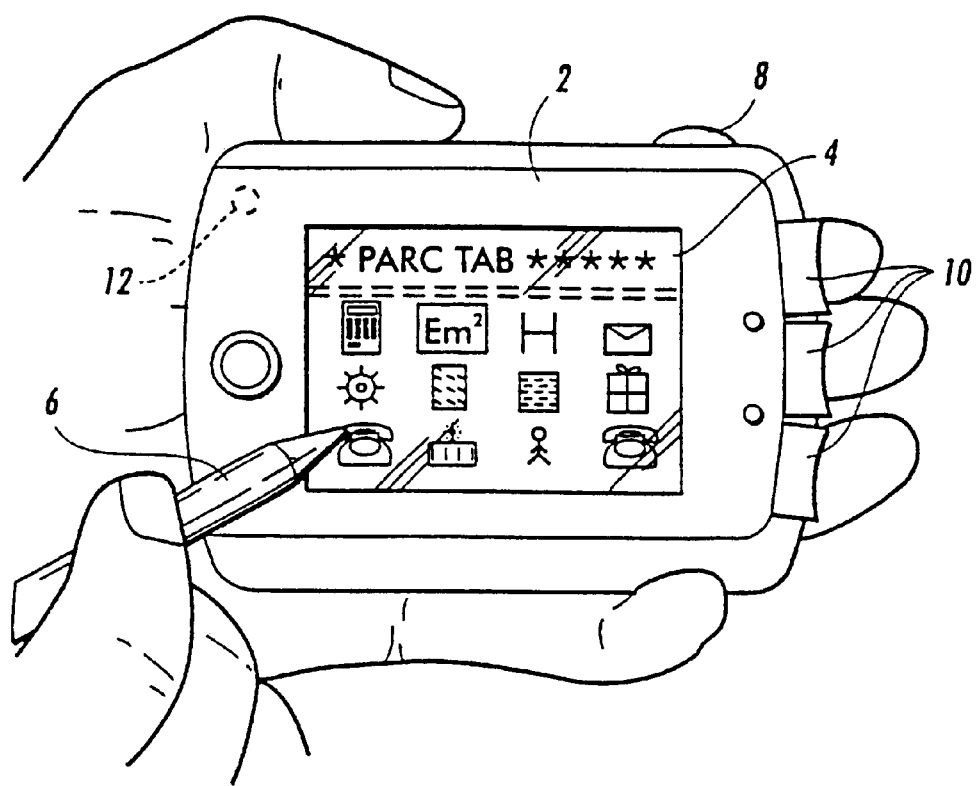
FIG. 2 is a view of a portable computing device that could be used in obtaining or transferring constraint descriptors.

FIG. 2 shows an example of portable computing device 2 described by Flynn et al. that can be used in an implementation. Portable computing devices could, however, be implemented in a multitude of forms, including any of the forms disclosed in copending, coassigned U.S. patent application Ser. No. 08/623,436, entitled "Personal Storage Device for Application and Data Transfer", U.S. Pat. Ser. No. 5,982,520, incorporated herein by reference.

Device 2 can include user interface circuitry for receiving user signals. The user interface circuitry can include display circuitry for presenting images on small bitmap screen 4 and selection circuitry for receiving user signals indicating items in images presented on screen 4, such as through circuitry that senses a position at which screen 4 is touched by a finger tip or by pointer 6 and circuitry for receiving signals provided through push buttons 10. The user interface circuitry can also include circuitry for providing audible signals to the user through tone generator 12.

Device 2, other portable computing devices, and some or all fixed computing devices connected to network 21 can be equipped for infrared communication or for wireless communication at other wavelengths, such as by well known radio technology. For example, data packets transmitted between device 2 and other devices, such as data packets encoding information enabling document retrieval, can conform to the physical and link layer formats (IRLAP) described in the industry standard Infrared Data Association (IrDA) specification, version 1.0, or subsequent versions, as is well known in the art. For this purpose, device 2 can have 19.2 Kb/s bidirectional IR communication circuitry for transmitting and receiving through diode transmitter/receiver 8.

Device 2 and other portable computing devices could also include communication circuitry for providing a wired or docking link to other portable computing devices or to fixed computing devices, using conventional techniques.

Device 2 can include a conventional microprocessor that presents images on screen 4, that receives user signals through the user interface circuitry and through transmitter/receiver 8, and that provides signals to other computing devices through transmitter/receiver 8. The microprocessor can be connected to conventional memory circuitry for storage of data.

As will be understood from the description below, the microprocessor could receive user signals indicating relations such as sets of values for one or more attributes of a document, could compile the relations into a constraint descriptor for a set of constraints, and could store the constraint descriptor in memory. Then, in response to further user signals, the microprocessor could encode the constraint descriptor in a data packet and provide the data packet to transmitter/receiver 8 for transmission to another device.

Further, the microprocessor could receive a data packet transmitted by another device from transmitter/receiver 8, and could decode it to obtain a constraint descriptor, which microprocessor could then store in memory. The microprocessor could also present an icon with a description of the constraint descriptor and, in response to a user signal indicating the icon, could transmit a data packet encoding the constraint descriptor to a fixed computing device to initiate a search for documents satisfying the set of constraints.

The microprocessor could operate in various other ways, some of which are mentioned below.

C. Knowledge Brokers and Feature Constraints

Although the invention could be implemented in various ways, the invention has been successfully implemented by programming computing devices to employ knowledge brokers and feature constraints as described by Andreoli et al., above. A demonstration of a prototype can be viewed at the web site page www.xrce.Xerox.com/research/ct/projects/cbkb/home.html. This section reviews relevant aspects of knowledge brokers and feature constraints.

Brokers are software agents that can process knowledge search requests. Knowledge is taken here to be any piece of electronic information intended to be publicly accessible. Different, possibly distributed, information sources are assumed to be available, from a simple file in a user's directory to a database local to a site, up to a wide area information service (WAIS) on the Internet, for example.

When receiving a request, a broker may have sufficient knowledge to process it, or may need to retrieve more knowledge. For that purpose, it releases sub-requests, aimed at other brokers. Thus, knowledge retrieval is achieved by the collaboration of all the brokers, which are alternatively service providers processing requests and clients of these services generating sub-requests. The infrastructure required to support such collaboration, and the way knowledge is stored locally within each broker can be understood from Andreoli, J.-M., Borghoff, U., and Pareschi, R., "The Constraint-Based Knowledge Broker Model: Semantics, Implementation and Analysis", *Journal of Symbolic Computation*, Vol. 21, No. 4, 1996, pp. 635–676, incorporated herein by reference. The following discussion addresses rather the knowledge manipulations occurring within each broker.

In order to collaborate, the brokers must at least understand each other. This can be achieved by formulating all requests and all answers to requests in a common language, even if the brokers may perform local translations. Logic provides an adequate language for such a purpose. A request can be expressed by a pair $<x, P>$ where x is a logical variable and P a logical formula involving x, meaning "Retrieve knowledge objects x such that the property expressed by formula P holds". Interestingly, an answer to such a request can be expressed in the same formalism, i.e. a pair $<x, Q>$ meaning "There exists a knowledge object x satisfying the property expressed by formula Q". The requirement here is that P must be a logical consequence of Q, so that the answer contains at least as much knowledge as the request. Moreover, the same logical formalism can be used to capture the scope of a broker, i.e. the area of knowledge it is concerned with: A broker with scope $<x, R>$ means "I am not capable of retrieving knowledge objects x which do not satisfy the property expressed by formula R". In many situations, the scope of a broker may vary, because it is specialized or, on the contrary, expands its capacities, either externally or due to the knowledge retrieval process itself.

In other words, logic provides a common language in which requests, answers, and scopes can all be expressed. Brokers then perform logical operations on these three components. The most important logical operation, from which all the others can be reconstructed, is satisfiability checking, i.e. deciding whether some object could satisfy the property expressed by a formula, or, on the contrary, whether it is intrinsically contradictory. Unfortunately, it is well known that this operation, for full classical logic, is not algorithmic, i.e. it is provably impossible to write a program which implements it and always terminates. Given this limitation, a great deal of research in knowledge representation has been focused on identifying fragments of classical logic in which satisfiability is algorithmically decidable. The trade-off here is between expressive power and tractability: The empty fragment, for example, is obviously tractable, but it is not very expressive.

The most popular fragment which emerged is known as "feature constraints". The satisfiability problem in this case is also known as "feature constraint solving".

As is known, feature constraints can be built from atomic constraints that are either sorts or features. A sort is a unary relation, expressing a property of a single entity. For example, P:person expresses that an entity P is of sort person. A feature is a binary relation expressing a property linking two entities. For example, P:employer-→E expresses that entity P has an employer, which is an entity E. Apart from sorts and features, most feature constraint systems also allow built-in relations such as equality and inequality, and such relations are also referred to herein as "built-in predicates" or "built-in constraints".

The full fragment of feature constraints, where the atomic components mentioned above are allowed to be combined by all the logical connectives (conjunction, disjunction, negation and quantifiers), although very expressive, is hardly tractable. A subfragment called "basic feature constraints" (BFC) has been considered, where negation and disjunction are simply forbidden. Efficient constraint solving algorithms have, been proposed for this sub-fragment. However, a drawback is that the complete absence of negation puts strong limitations on the kind of operations a knowledge broker may wish to perform.

Brokers can use a powerful operation, referred to as "scope-splitting", which relies on the use of negation. Indeed, a broker may wish to split its scope, specified by a pair <x, P> according to a criterion expressed by a formula F, thus creating two brokers with scope P∧F and P∧¬F. Thus, a broker in charge of bibliographic information may wish to split its scope into two new scopes: "books written after 1950", which can be represented by a BFC that includes two feature constraints and a built-in constraint

X

X: book

X: year→Y

Y>1950, and its complement, i.e. "books written before 1950 or documents which are not books"; this latter scope cannot be expressed using BFC, because negation and disjunction cannot be dispensed with. It has been discovered that the scope splitting operation is useful in many situations, for example to implement brokers capable of memorizing and reusing information gathered during their lifetime. A broker can, for example, use, on the one hand, a fragment of feature constraints, called "signed feature constraints" (SFC), which allows limited use of negation, precisely capable of expressing the kind of split scope mentioned above, and, on the other hand, an efficient constraint solving method for SFC.

A signed feature constraint is composed of a positive part and a list of negative parts, both of them being basic feature constraints. For example, the following signed feature constraint

P

+P: person,

P: employer→E,

E: "Xerox"

P: nationality→N,

N: "American"

P: spouse→P'

P!': person

P': employer→E'

E': "Xerox"

specifies a Xerox employee who is not American and is not married to another Xerox employee.

Figure 3:
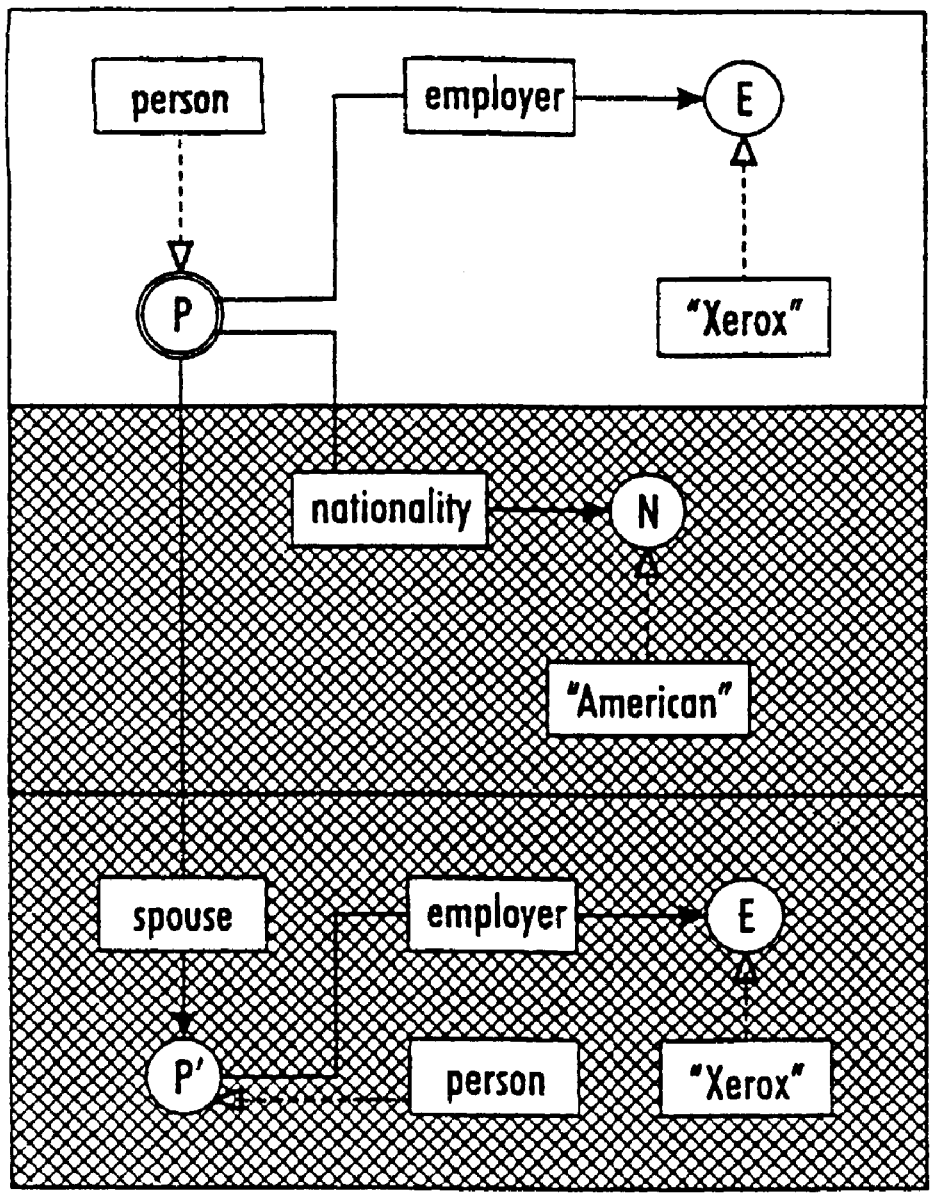
FIG. 3 is a schematic diagram showing the scope defined by a constraint.

This SFC can be represented graphically as in FIG. 3. The round boxes denote the entities (logical variables), the sort relations (unary) are represented by dashed arrows labeled by the name of the sort in a square box, the feature relations (binary) are represented by plain arrows labeled by the name of the feature in a square box. Built-in predicates (not present in the example) could be represented by rhombuses. The positive part of the SFC is contained in the top box and marks the distinguished entity of the scope (P in the example) by a double round box. The negative parts of the SFC are contained in the lower boxes in gray.

The main interest of SFCs comes from the following property: If the scope of a broker is represented by an SFC $e_o$, and this scope is split by a BFC e, then the two resulting split scopes $e^+$, $e^-$ are both SFCs.

Indeed, $e^+$ can be obtained by merging the positive part of $e_o$ with the BFC e, and $e^-$ can be obtained by extending $e_o$ with a new negative part containing e alone. For example, assume a broker in charge of a bibliographical database containing various documents (books, videos etc.) about art, but not authored by an American. The database can be represented by the SFC

X

+X: topic→T

T: "Art"

−X: author→A

A: nationality→N

N: "American"

The SFC may be split by the constraint "books written after 1950", expressed by the BFC

X

X: book

X: year→Y

Y>1950

The resulting scopes are simply

X

+X: book

X: topic→T

X: year→Y

T: "Art"

Y→1950

−X: author→A

A: nationality→N

N: "American"

i.e. "Art books written after 1950 but not by an American author" and

X

+X: topic→T

T: "Art"

−X: author→A

A: nationality→N

N: "American"

−X: book

X: year→Y

Y>1950 i.e. "Art documents not authored by an American but not books subsequent to 1950".

Most constraint systems make a number of assumptions on the nature of sorts and features, called the axioms of the systems. These axioms are crucial to the satisfiability algorithm, since they determine when a feature constraint is contradictory and when it is satisfiable.

For the purpose of simplicity, the implementation disclosed here makes use of a slight variant of the basic axiom system used in Aït-Kaci, H. et al., "A Feature-Based Constraint-System for Logic Programming with Entailment", *Theoretical Computer Science*, Vol. 122, 1994, pp. 263–283, although it will be appreciated by persons skilled in the art that the principles of the method apply to other sets of axioms as well.

1. Features are functional: This means that if two pairs of entities which are constrained by the same feature have the same first term, they also have the same second term. For example, it can be considered that the feature spouse is functional (within a specific cultural setting), meaning that a person cannot have two spouses: If, for a person x, we have X:spouse→Y and X:spouse→Z, then the entities Y and Z coincide (i.e. denote the same person). Other systems allow multi-valued features.

2. Sorts are disjoint: this means that no entity can be of two distinct sorts. For example, a book is not a person: We cannot have an entity X with X:book and X:person. Other systems consider hierarchies of sorts where some entities can have multiple sorts as long as they have a common denominator in the hierarchy.

3. There is a distinguished subset of sorts, called "value" sorts, so that no two distinct entities can be of the same value sort. Traditional basic elements (strings, numbers, etc.) are typical value sorts: For example, the string "Xerox" or the number 1950 are value sorts. Value sorts are not allowed to have features: This is the only axiom connecting sorts and features. Other systems consider more refined connections between sorts and features.

4. There is a distinguished built-in binary predicate, equality, with the traditional congruence axioms (which involve sorts and features). The axioms describing all the other built-in predicates are assumed to contain no mention of sorts and features.

These axioms are formally written in section A: Axioms in the Appendix at the end of this specification. They form a theory T.

Based on this axiom system, a set of SFCs can be solved by a constraint satisfaction process as follows:

First, it is assumed that satisfiability over built-in predicates is decidable. This means that there is an algorithm which, given a formula F using only built-in predicates (F is also called a built-in constraint), can decide whether F is a logical consequence of the theory T(written $I\vdash_T F$).

Constraint satisfaction over BFCs is defined by a set of conditional rewrite rules over BFCs (section B.1 of the Appendix) which have the following properties (a) The system of rules is convergent and hence defines a "normal form" for BFCs. This can be shown in a classical way by proving that the system is "Church-Rosser" (critical pairs converge) and "Noetherian" (the size of the terms strictly decrease by rewriting).

(b) A BFC is satisfiable if and only if its normal form is not reduced to the contradiction. One implication can be proved by showing that rewrite steps preserve satisfiability. The reverse implication can be proved by displaying a model that satisfies BFCs whose normal form is not reduced to the contradiction.

Thus the rewrite rules describe the steps of a constraint satisfaction algorithm. This algorithm always terminates because the system of rewrite rules is convergent. It is to be noted that the definition of the rules relies on satisfiability tests of built-in constraints, which have been assumed decidable. This means that the algorithm is modular and can accommodate any kind of built-in constraints as long as a proper built-in constraint satisfaction algorithm is provided.

Rewrite rules for a constraint satisfaction algorithm can be implemented in a naive way in some symbolic language like Lisp or Prolog, or can be optimized, taking into account the properties of the specific built-in constraints which are used.

The algorithm for constraint satisfaction over SFCs (section B.2 of the Appendix) can informally be described as follows. Given an SFC, its positive component is first normalized by the algorithm for BFCs. If the result is a contradiction, the whole SFC is unsatisfiable. Otherwise, the normalized positive component is inserted in each of the negative components, which are then normalized by the algorithm for BFCs. If a resulting negative component has a contradictory normal form, it is eliminated, and if it has a tautological normal form the whole SFC is unsatisfiable. The normal form for SFCs thus obtained has the following property:

An SFC is satisfiable if and only if its normal form is not reduced to the contradiction. A non-contradictory normal form is thus a solution of the SFC.

D. Transactions

FIGS. 4–12 illustrate several transactions that can be performed in the current implementation.

Figure 4:
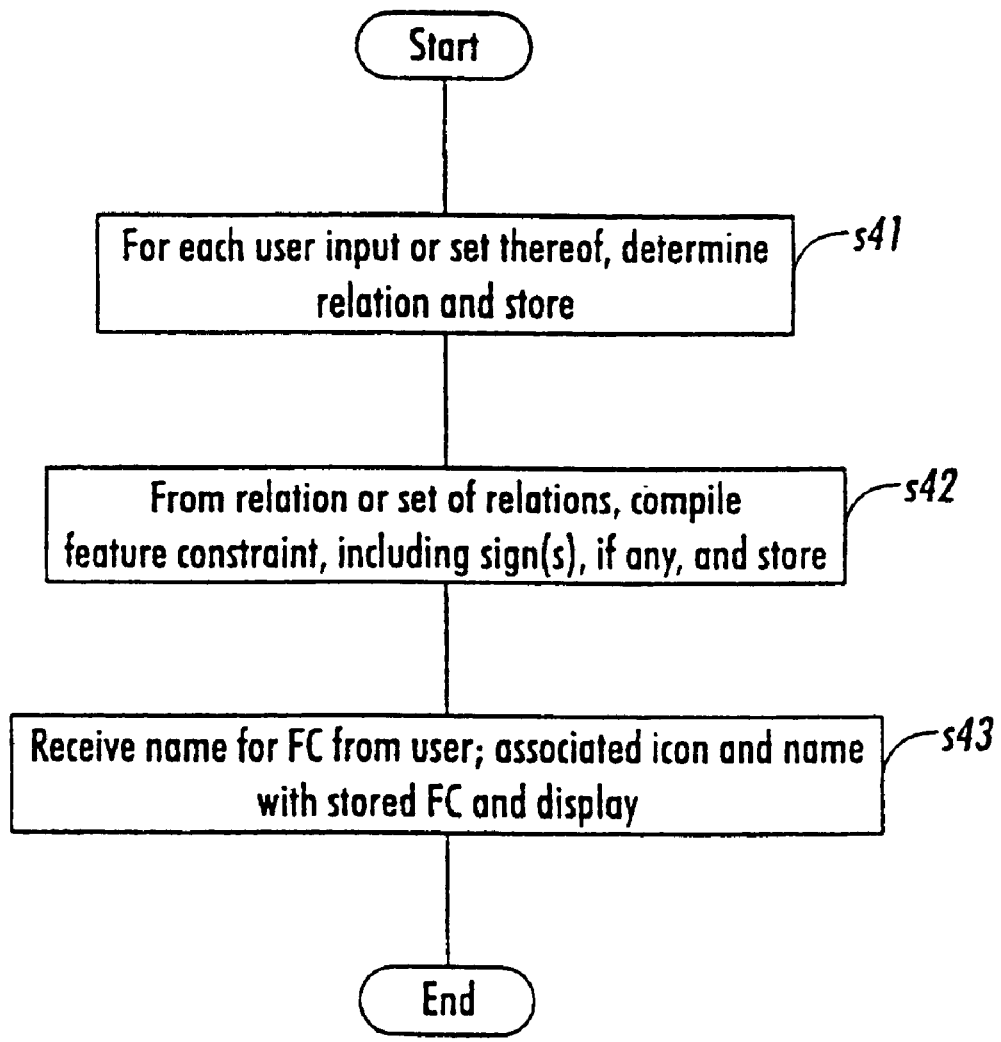
FIG. 4 is a schematic flow chart of operations in obtaining a constraint descriptor.

FIG. 4 shows operations that, can be performed by the processor of a device in obtaining a constraint descriptor. In box s41, the processor receives a series of user input signals through user interface circuitry. The user input signals may be received in sets.

Figure 5:
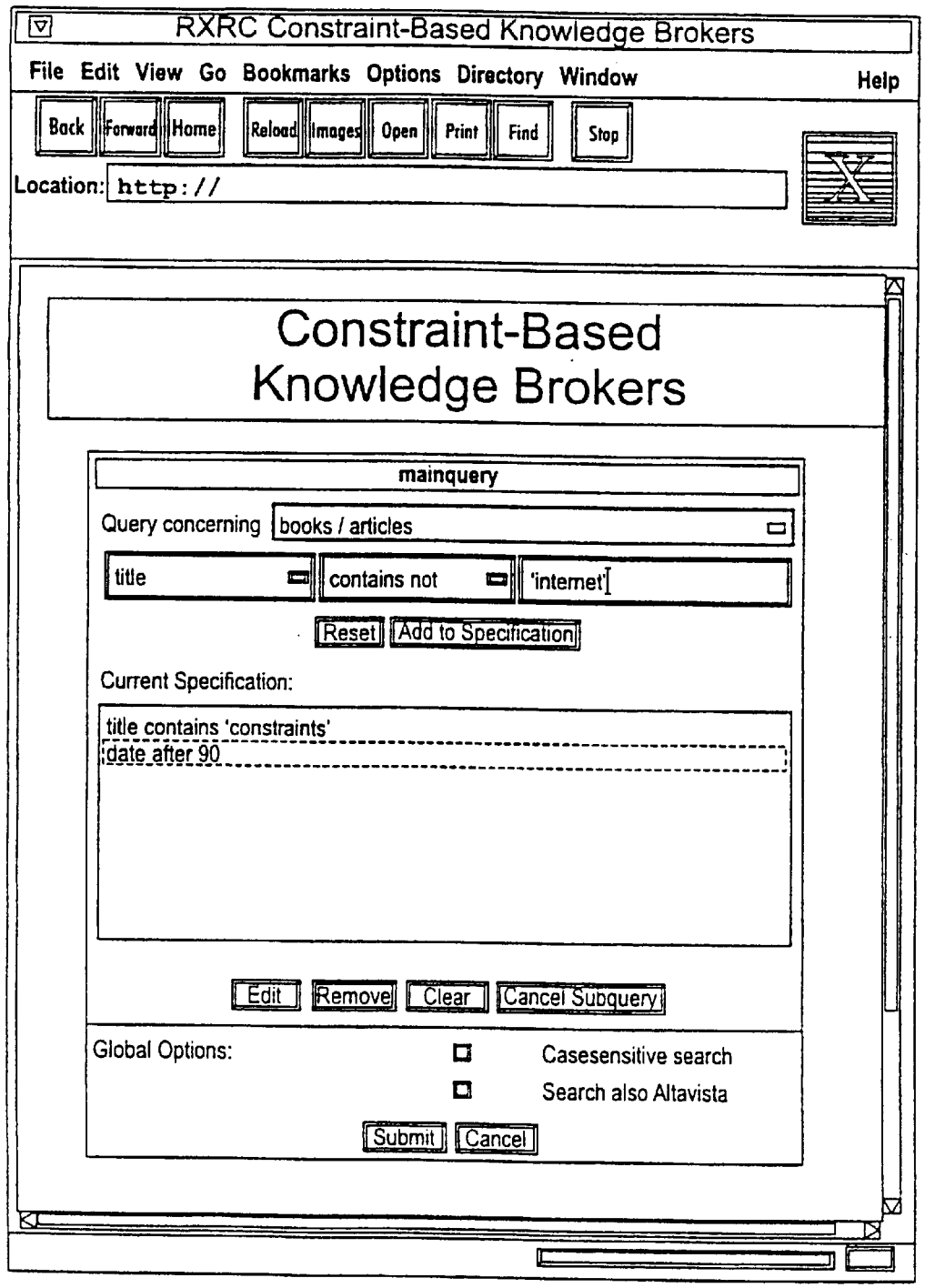
FIG. 5 is a schematic version of an image presented by a fixed computing device in response to user signals indicating a query.

FIG. 5 shows an image presented by display circuitry of a fixed computing device while a user is entering a query, e.g. "books or articles after 1990 in which the title contains 'constraints' but does not contain 'internet'". As discussed in greater detail in copending, coassigned U.S. patent application 09/421,846, filed Oct. 20, 1999 entitled "Document Constraint Descriptors Obtained From User Signals Indicating Attribute-Value Relations", incorporated herein by reference, the image includes boxes any of which the user can select by mouse inputs, after which the user can type or complete an element of the query in the selected box. The image also includes buttons that the user can select by mouse inputs to select an attribute of a document, a constraint operator applicable to an attribute, or to restart, add to, edit, build up, or otherwise modify a query. Each element of the query is added to the current specification of the query, and the image also includes a box that contains the current specification.

The image also includes a button the user can select to launch a search based on the current specification of the query. When the user launches a search, the processor determines the relations indicated by the set of the user input signals that produced the current specification and stores data indicating the relations in memory, in box s41. In practice, the processor can maintain at all times a data structure that indicates relations in the current specification, and the contents of this data structure can then be used when a search is launched.

User signals indicating a set of constraints could be provided in various other ways. For example, the user could provide signals to the processor of a portable computing device, using a keyboard or a touchscreen user interface on which lists of items are displayed and can be navigated or selected using scrolling and control buttons. Where the screen of a device is too small for such techniques, members of a stored set of items of data could be accessed in the manner described in EP-A-733,964.

User signals could also be provided to the processor of a fixed computing device through a scanner, in the manner described in copending, coassigned U.S. patent application Ser. No. 09/421,846, entitled "Document Constraint Descriptors Obtained From User Signals Indicating Attribute-Value Relations", incorporated herein by reference. As described there, a paper form can include fields in which a user can enter machine-readable information about values of document attributes, such as type of document, author's name, date, topic, and so forth. Or a user could write or type information relating to values of document attributes on another image-bearing portable medium, and OCR or handwriting recognition could be performed to receive user signals.

In the act in box s42, the processor then uses the stored data indicating relations from box s41 to compile a feature constraint, which can be thought of as beginning to solve a constraint that is equivalent to the relations. To compile a feature constraint, the processor can, for example, perform conventional operations that eliminate redundancy, check for consistency, reorganize constraints by making local inferences, propagate information from one part of the feature constraint to another, and generally perform operations that make the representation of the constraint more concise. At one extreme, compilation may simply involve converting the logical relations into a format in which the equivalent constraint can be more readily solved; at the other extreme, compilation may involve completely solving the equivalent constraint. The compiled feature constraint can thus be an item of data that includes signs occurring in the stored relations. The processor stores the compiled feature constraint in memory.

The processor can then present an image prompting the user to enter a query identifier, such as a short query name, through the user interface circuitry. In box s43, the processor can receive the name from the user, or can automatically generate a default name if no name is received. The processor can then store data associating the stored feature constraint with its name and with data defining an icon for the feature constraint. The processor can also present an image that includes the icon and name of the feature constraint.

Figure 6:
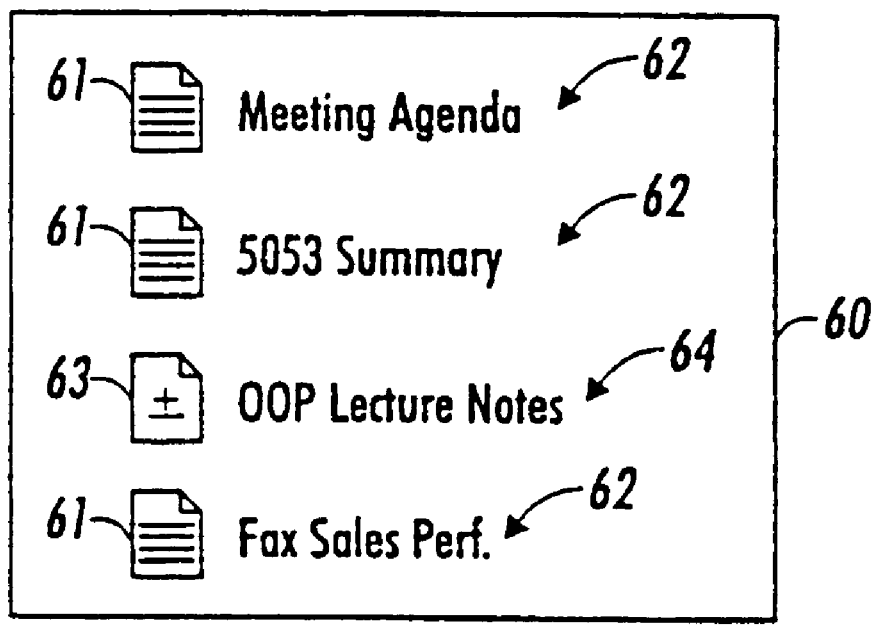
FIG. 6 is a schematic version of an image presented by a portable computing device including items representing document references and an item representing a stored constraint.

FIG. 6 shows image 60 presented by user interface circuitry of a portable computing device such as device 2 in FIG. 2, on which images can be presented as described by Flynn et al., above. As described by Flynn et al., icons 61, each with one of document names 62, can be presented to represent document references such as stored Web URLs. In addition, one of the items in the image can include icon 63 and short query name 64, representing a stored feature constraint. Icon 63 can include a "+", suggesting that the user can select icon 63 and perform button presses equivalent to a double mouse click to request an expanded version of the item. In response, a similar image can be presented, but with short query name 64 replaced or overwritten by a long version of the query, such as "Books by Babbage after 1993 with title including 'lecture' and 'object-oriented'".

Figure 7:
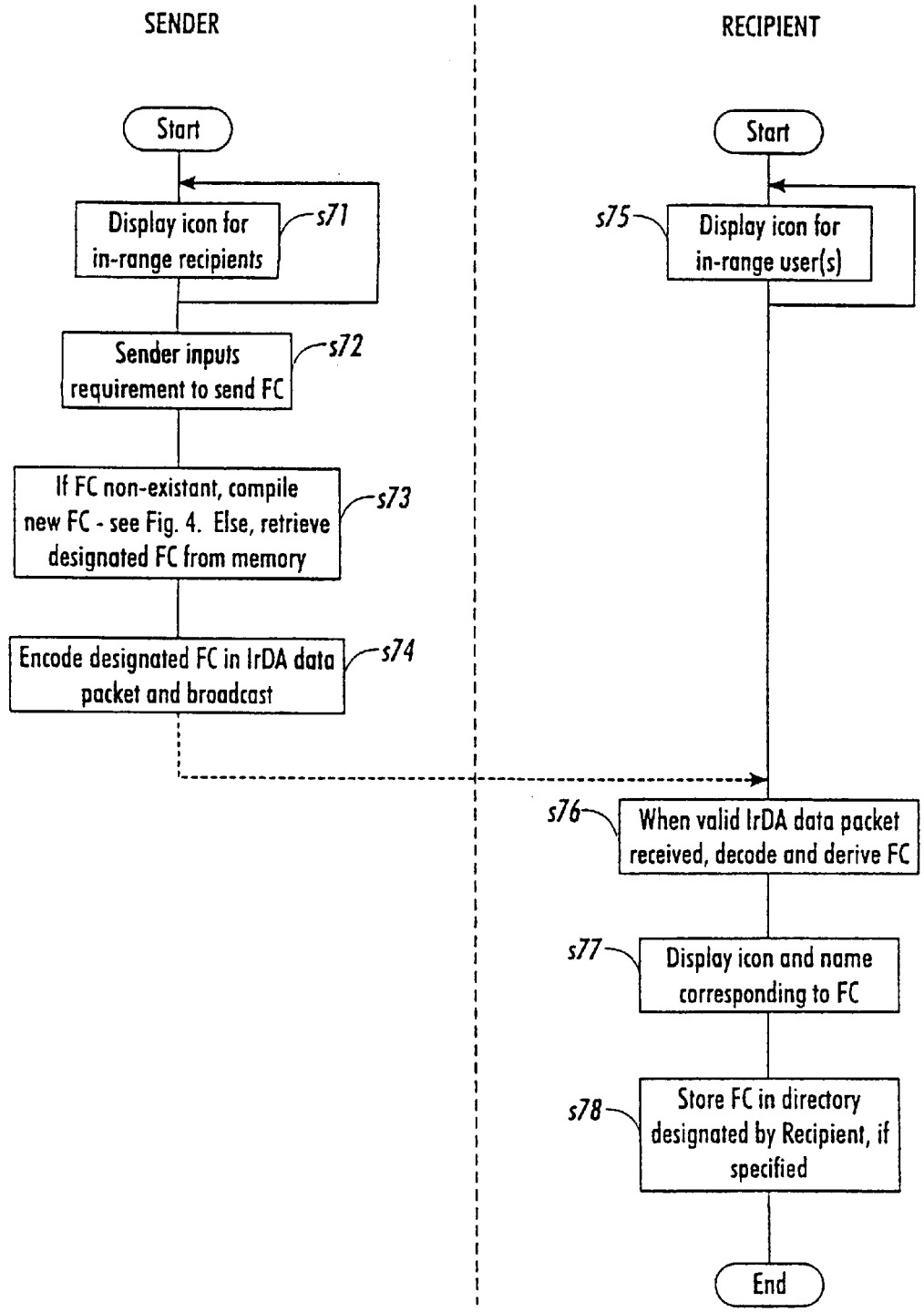
FIG. 7 is a schematic flow chart of operations performed in transferring a constraint descriptor from one device to another device.

FIG. 7 shows operations performed by processors of two computing devices between which a feature constraint is transferred. The left side of FIG. 7 shows operations performed by the processor of a sending device, while the right side shows operations by the receiving device. As described by Flynn et al., above, both devices are context sensitive. Therefore, when the devices are in range for IR communication, the user interface circuitry of each device can present an image that includes an icon representing the other device as well as other in-range devices, as shown in box s71 for the sending device and in box s75 for the receiving device.

The user of the sending device can then provide user signals requesting transfer of a feature constraint to the receiving device, such as by selecting the icon of the receiving device or by selecting an icon representing a feature constraint and indicating the receiving device in another way. The processor can receive the user signals in box s72. In response, the processor can determine in box s73 whether the request is to transfer a feature constraint that already exists, in the sense that it has been compiled and stored. If not, the processor can compile a new feature constraint, such as by performing the operations shown in FIG. 4 above. But if the feature constraint already exists, the processor can retrieve it from memory.

Finally, in box s74, the processor can encode the feature constraint in an appropriate form for transfer to the receiving device, such as an IrDA data packet. The processor can then transfer the encoded feature constraint, such as by broadcasting it as an IR signal in accordance with IrDA standard data transfer or by transferring it using any other appropriate communication technique, such as the conventional techniques described by Flynn et al., above. FIG. 8 illustrates a data packet in which a feature constraint could be encoded, with k bytes for a preamble, I bytes for a destination address, m bytes for a source address, n bytes for a type field, o bytes for a data field, and p bytes for a cyclic redundancy check (CRC) or other error correction code. The type field can be used to distinguish data packets that contain constraints from answers, from control messages, and so forth. The feature constraint can be included in the data field of one data packet or in the data fields of a series of data packets.

Upon receiving a valid IrDA data packet, the processor of the receiving device decodes to derive the feature constraint, in box s76. The processor can present an image that includes an icon and a short query name for the feature constraint through the receiving device's user interface circuitry, in box s77. In addition, if the user of the receiving device specifies a designated location in the receiving device's directory, the processor can store the feature constraint at the designated location, in box s78. The stored feature constraint can subsequently be used in other operations, such as in further transfers to other computing devices, if necessary, or in retrieving document references.

Figure 9:
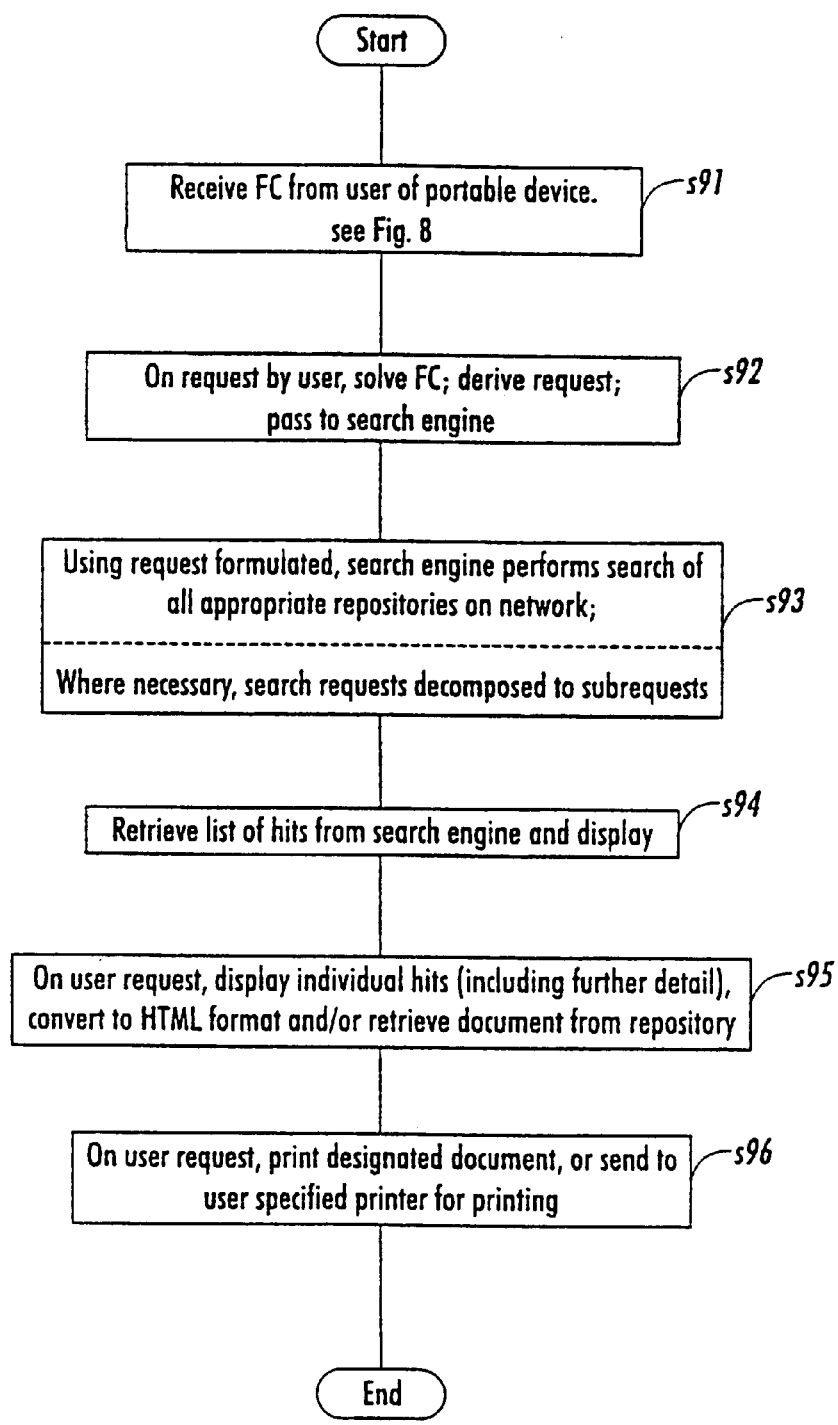
FIG. 9 is a schematic flow chart of operations performed in using a constraint to retrieve document references and the documents they indicate.

FIG. 9 illustrates operations performed by the processor of a computing device in using a feature constraint to retrieve document references and in displaying or printing documents. The operations could be performed, for example, by the processor of a fixed computing device such as a conventional PC, Mac, or workstation or by a multi-function device or by a printer with an appropriate user interface.

In box s91, the processor receives a feature constraint. The processor can receive the feature constraint in a data packet from a portable computing device as described above in relation to FIG. 8, or in any other appropriate way. For example, through well-known techniques, a user could operate a keyboard and mouse or touchscreen of the computing device to directly provide input signals indicating the feature constraint.

In box s92, the processor receives further user signals requesting a search for documents satisfying the feature constraint. The user signals can again be received in any appropriate way, such as by presenting an image that includes an item representing the feature constraint and receiving a user signal selecting the item.

In response, the processor can solve the feature constraint using the techniques described above for solving basic feature constraints and signed feature constraints. If compilation in box s42 completely solves the equivalent constraint, no further solution is necessary in box s92, but if compilation in box s42 merely changes format or the like, it is necessary to perform all the remaining computation necessary to obtain a solution. Therefore, solving the constraint in box s92 can be thought of as completing the solution process that was begun by compiling in box s42. The solution process could be divided between compilation and solving in many different ways, and the two operations could be at least partially redundant.

If the processor obtains a solution, the solution can be used to formulate a search request, which the processor can then provide in a call to search engine routines it also executes. In general, the search engine routines can in turn call remote search engines, such as through the Internet, and any appropriate combination of local and remote search operations can be employed.

In box s93, the processor executes the search engine routines and uses the search request formulated in box s92 to perform a search of all appropriate repositories on a network to which the computing device is connected. Alternatively, the search could be performed on any appropriate subset of the repositories. The search could include providing versions of the search request to other search engines on the network. Where necessary, the search engine can perform a brokering process that breaks down the search request from box s92 into subrequests as described in Andreoli, J.-M., Borghoff, U., and Pareschi, R., "The Constraint-Based Knowledge Broker Model: Semantics, Implementation and Analysis", *Journal of Symbolic Computation*, Vol. 21, No. 4, 1996, pp. 635–676, incorporated herein by reference. As will be understood, the brokering process may include scope splitting, specialization of brokers, and solution of constraints equivalent to subrequests.

Figure 10:
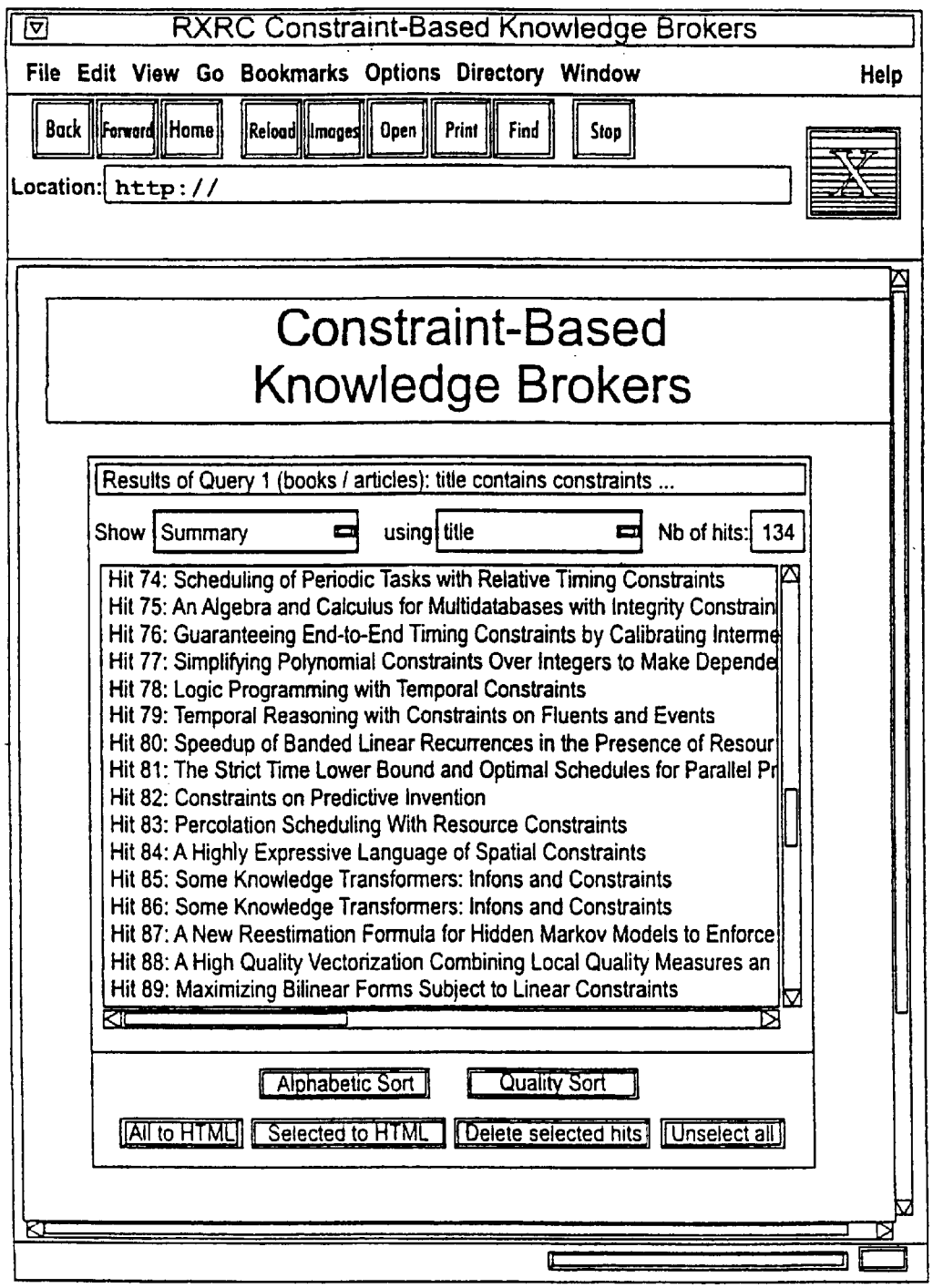
FIG. 10 is a schematic version of an image presented by a fixed computing device presenting a list of items representing document references, as in box s94 in FIG. 9.

The search engine routines return a list of "hits", i.e. document references such as Web URLs identifying documents satisfying the feature constraint. In box s94, the processor retrieves the list of hits and presents an image that includes information about the hits. FIG. 10 illustrates an example of an image that could be presented, with a window in which each hit is represented by an item in the form of a line of text. Each hit's line of text includes the hit's number and a brief description of the document indicated by the hit, such as the document's title.

The user can provide input signals requesting information about one or more identified individual hits. In response, in box s95, the processor can present one or more further images with information about the identified is individual hits, such as by presenting a hit with expanded details about the document, by presenting document information converted into HTML format, or by presenting a version of the document itself downloaded from the repository that contains it.

Figure 11:
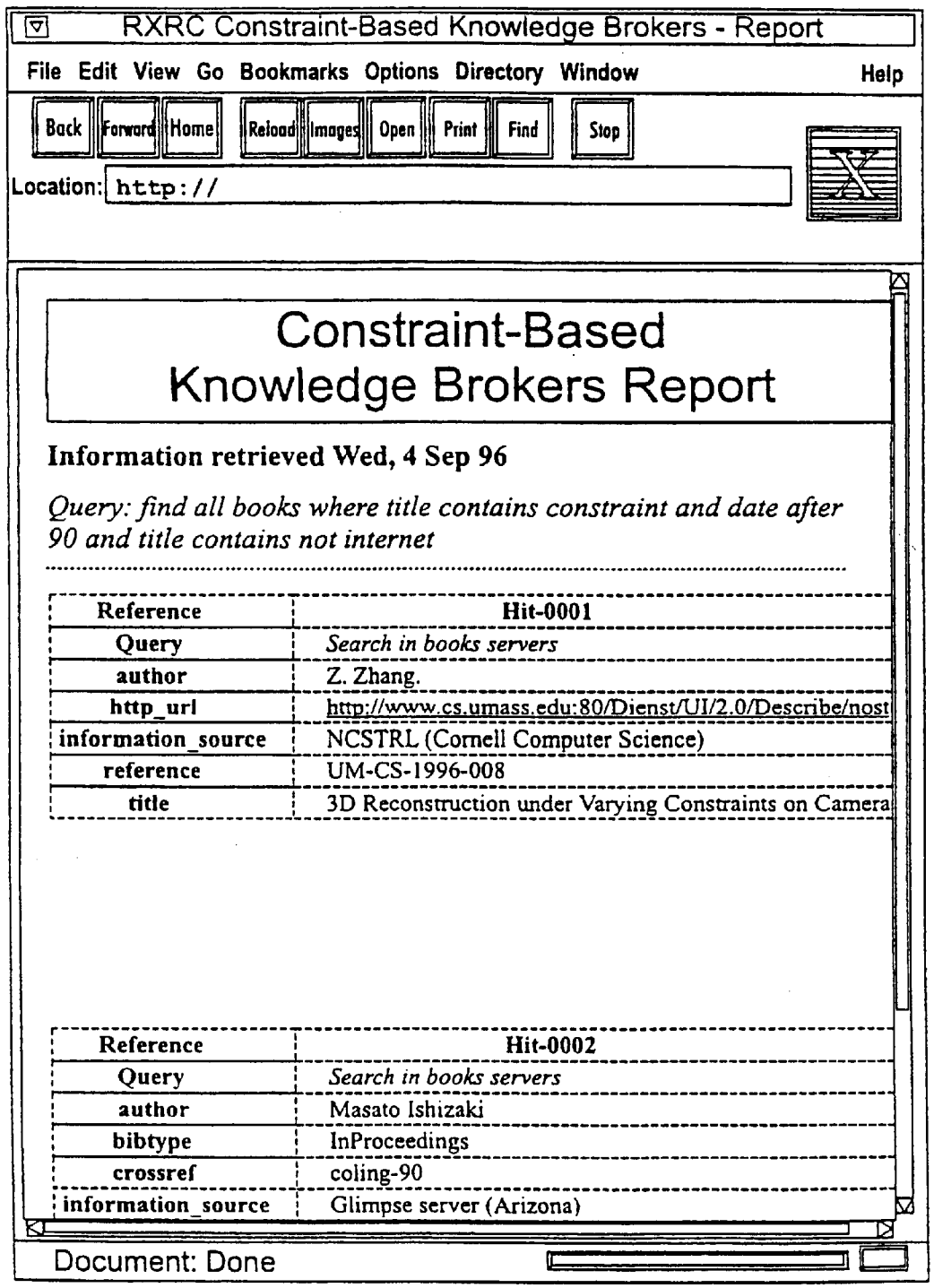
FIG. 11 is a schematic version-of an image presented by a fixed computing device showing selected items from the list in FIG. 10 after transformation into HTML format, as in box s95 in FIG. 9.

FIG. 11 illustrates an example of an image that could be presented in box s95, in which the information about each hit has been converted into HTML format. For each hit, the display information can include author name, http URL, information source, reference, and title.

Figure 12:
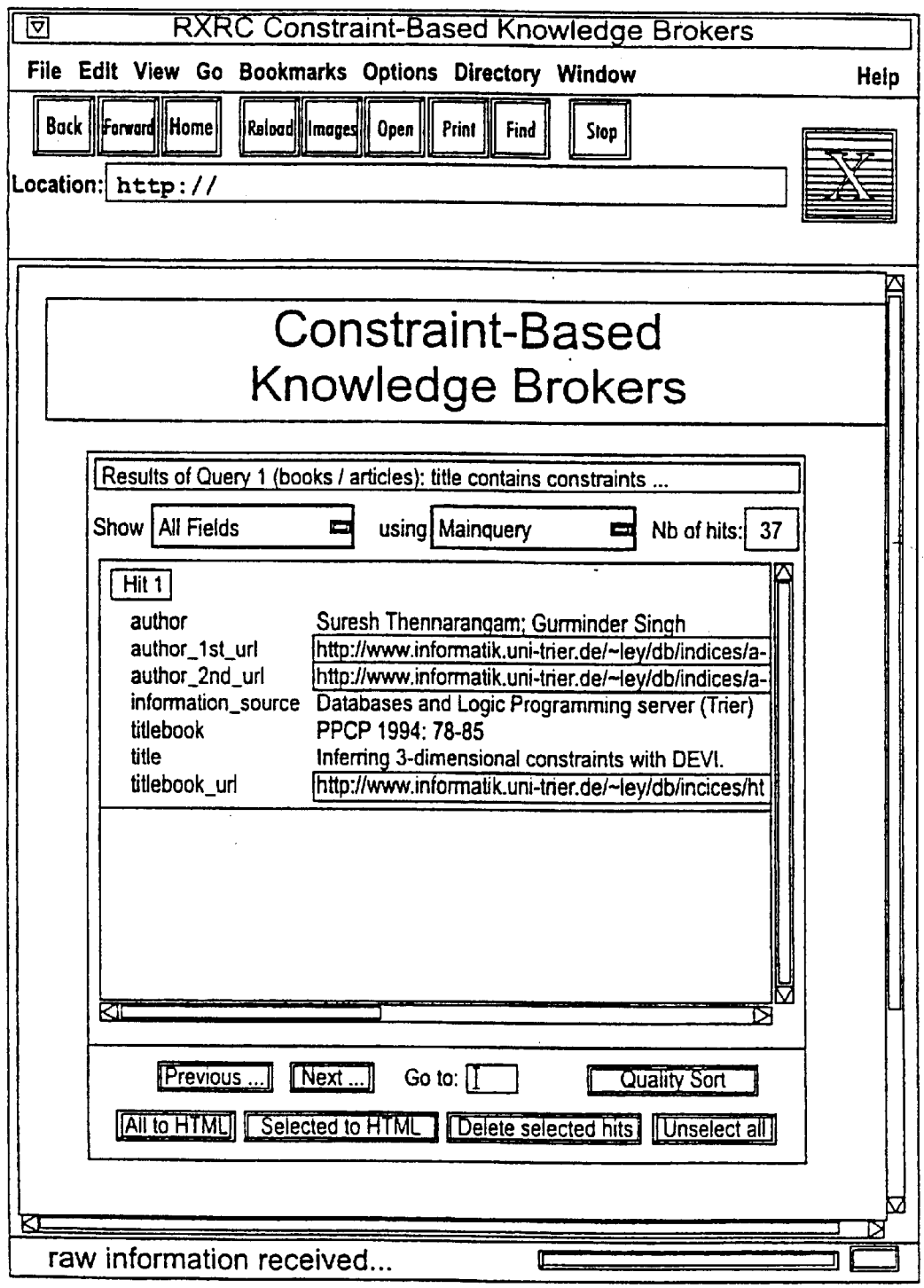
FIG. 12 is a schematic version of an image presented by a fixed computing device presenting in more detail a single item from the list in FIG. 10.

FIG. 12 illustrates another example of an image that could be presented in box s95, in which a more complete set of attributes of one hit's document is included. In FIG. 12, the displayed values for some of the attributes are not explicitly shown, but are shown as URLs that provide links to pages that contain information related to those attributes.

The user can also provide input signals requesting that a hit's document be printed or be sent to a user specified printer for printing. In response, in box s96, the processor can download the document and print it on the user's default printer or on a user specified printer.

E. Variations

The implementations described above could be varied in numerous ways within the scope of the invention.

The implementation described above has been successfully executed using machines specified above, but implementations could be executed on other machines.

The implementation described above has been successfully executed using software described above, but various other software could be used, developed for a wide variety of programming environments and platforms. For example, techniques other than knowledge brokers and feature constraints could be used.

The implementation described above employs constraint descriptors that are signed feature constraints compiled from logical relations, but the invention could be implemented with other types of constraints, including basic feature constraints and built-in constraints, and with constraints obtained in various ways other than by compiling from logical relations.

The implementation described above involves transfer of constraints between specified types of computing devices using specified communication techniques such as IrDA standard data transfer and the Internet, but the invention could be implemented to transfer constraints between a wide variety of different computing devices and using any of a wide variety of communication techniques. For example, the invention could be implemented using devices that are all connected to a network, or it could be implemented using devices that cannot communicate through a network, but can only communicate through electromagnetic waves such as IR or radio waves, or it could be implemented using any combination of such devices.

In the implementation described above, the computing devices have user interface circuitry that includes specified types of devices, such as displays, keyboards, touchscreens, buttons, mice, but the invention could be implemented with any suitable kind of user interface circuitry.

The implementation described above presents specific types of images in which items include icons and names or titles, but the invention could be implemented with or without presentation of images, and the images presented could take any appropriate form, with or without icons and with or without names or titles. The images could, in addition, be presented through a paper user interface using printed check boxes on paper or the like.

The implementation described above employs URLs as document references, but document references could take any appropriate form. For example, the World Wide Web Consortium (W3C) defines uniform resource names (URNs) that could be used.

The implementation described above uses search engine routines to find documents satisfying a constraint, and a wide variety of search engines using various search techniques could be used to find such documents.

The implementation described above mentions several specific attributes of documents, but a wide variety of other document attributes could be used. Furthermore, the implementation described above treats attributes or features of documents as independent, and could be applied even to attributes or features with trivial dependencies that can be ignored, but a different approach might be required to obtain optimal results with attributes or features that have complex dependencies.

In the implementation described above, specific acts are performed that could be omitted or performed differently. For example, in FIG. 4, a feature constraint compilation could be performed after each relation is determined, or it could only be performed when requested by a user.

In the implementation described above, acts or operations are performed in an order that could be modified in many cases. For example, in FIG. 9, individual hits could be displayed immediately when obtained from the search engine rather than first displaying a list of hits.

The implementation described above uses currently available computing techniques, but could readily be modified to use newly discovered computing techniques as they become available.

F. Applications

The invention can be applied to document information retrieval and distribution, such as in a system that employs the Internet. The system can include a combination of portable and fixed computing devices.

G. Miscellaneous

The invention has been described in relation to software implementations, but the invention might be implemented with specialized hardware.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

Appendix

A Axioms of the System

There are three sets of axioms.
Specific axioms for features and sorts:
Let r, r' denote any sorts, and f denote any feature.

$$\forall x, y, z \; x \xrightarrow{f} y \wedge x \xrightarrow{f} z \supset y = z$$

$$\forall x \neg (x{:}\tau \wedge x{:}\tau') \text{ if } \tau \neq \tau'$$

$$\forall x, y \; x{:}\tau \wedge y{:}\tau \supset x = y \text{ if } \tau \text{ is a value sort}$$

$$\forall x, y \; \neg \left( x{:}\tau \wedge x \xrightarrow{f} y \right) \text{ if } \tau \text{ is a value sort}$$

Congruence axioms for equality:
Let p denote any built-in predicate. The traditional congruence axioms are:

$$\forall x \; x = x$$

$$\forall x, y \; x = y \supset y = x$$

$$\forall x, y, z \; x = y \wedge y = z \supset x = z$$

$$\forall x, y \; x{:}\tau \wedge x = y \supset y{:}\tau$$

$$\forall x, y, z \; x \xrightarrow{f} y \wedge x = z \supset z \xrightarrow{f} y$$

$$\forall x, y, z \; x \xrightarrow{f} y \wedge y = z \supset x \xrightarrow{f} z$$

$$\forall \vec{x}, y \; p(\vec{x}) \wedge x_i = y \supset p(\vec{y})$$

where i is some index in the list of variable $\vec{x}$ and $\vec{y}$ is identical to $\vec{x}$ except that $y_i = y$.

Built-in predicate axioms:
They must not mention sorts and features. For example, disequality can be axiomatized by $$\forall x,y \; x \neq y \vee x = y$$

$$\forall x \neg (x \neq x)$$

Precedence constraints are axiomatized by $$\forall x \neg (x < x)$$

$$\forall x,y,z \; x < y \wedge y < z \supset x < z$$

The built-in predicates $>$, $\leq$, $\geq$ can then be defined from $<$ and equality.

B Constraint Satisfaction

B.1 The BFC Case

We represent a BFC as a pair $(B | \Gamma)$ where B is a built-in constraint and $\Gamma$ an unordered list of sort and feature constraints (read conjunctively). $\bot$ denotes the contradiction.

There are two sets of rewrite rules. The following rules correspond to simplifications of the BFCs.

$$\left\langle B \;\middle|\; x \xrightarrow{f} y, z \xrightarrow{f} t, \Gamma \right\rangle \mapsto \left\langle B \wedge y = t \;\middle|\; x \xrightarrow{f} y, \Gamma \right\rangle \text{ if } \vdash \tau B \supset x = z$$

$$\langle B \mid x{:}\tau, y{:}\tau, \Gamma \rangle \mapsto \langle B \mid x{:}\tau, \Gamma \rangle \text{ if } \vdash \tau B \supset x = y \text{ and } \tau \text{ is not a value sort}$$

$$\langle B \mid x{:}\tau, y{:}\tau, \Gamma \rangle \mapsto \langle B \wedge x = y \mid x{:}\tau, \Gamma \rangle \text{ if } \tau \text{ is a value sort}$$

The following rules correspond to the detection of inconsistencies.

$$\langle B \mid \Gamma \rangle \mapsto \bot \text{ if } \vdash \tau \neg B$$

$$\langle B \mid x{:}\tau, y{:}\tau', \Gamma \rangle \mapsto \bot \text{ if } \vdash \tau B \supset x = y \text{ and } \tau \neq \tau'$$

$$\left\langle B \;\middle|\; x{:}\tau, y \xrightarrow{f} z, \Gamma \right\rangle \mapsto \bot \text{ if } \vdash \tau B \supset x = y \text{ and } \tau \text{ is a value sort}$$

The following property justifies the algorithm $$\langle B | \Gamma \rangle \mapsto \bot \text{ if and only if } \vdash \tau \forall \neg \left( B \wedge \bigwedge_{c \in \Gamma} c \right)$$

B.2 The SFC Case

We represent an SFC as an unordered list of BFCs prefixed with a sign (+ or −); by definition, one and only one component is positive. Let S be an SFC. The SFC-normal form of S is written S* and is obtained by the following algorithm:

Let $c_o$ be the BFC normal form of the positive component of S.
If $c_o = \bot$ Then
Return $\bot$
Else
$c_o$ is of the form $(B_o | \Gamma_o)$
Let $\{(B_i | \Gamma_i)\}_{i=1, \ldots, n}$ be the list of negative components of S.
For each i=1, ..., n
Let $c_i$ be the BFC normal form of $(B_o \wedge B_i | \Gamma_o, \Gamma_i)$.
If there exists i∈1, ..., n such that $c_i = (B | \Gamma)$ and $\bullet_\tau B$ and $\Gamma$ is empty Then
Return $\bot$
Else
Let I={i∈1, ..., n such that $c_i \neq \bot$}
Return $\{+c_o, \{-c_i\}_{i \in 1}\}$ The following property justifies the algorithm $$[+\langle B_o | \Gamma_o \rangle, \{-\langle B_i | \Gamma_i \rangle\}_{i=1}^n]^* = \bot$$

$$\text{if and only if } \vdash \tau \forall \neg \left[ \left( B_o \wedge \bigwedge_{c \in \Gamma_o} c \right) \wedge \bigwedge_{i=1}^n \neg \left( B_i \wedge \bigwedge_{c \in \Gamma_i} c \right) \right]$$

What is claimed is:
1. A method for transferring information about documents between machines, the method comprising:
   (A) operating a first machine to obtain a constraint descriptor; the constraint descriptor comprising one or more feature constraints defining logically-connected information about a set of one or more constraints that documents can satisfy, the constraint descriptor being displayed as a graphical image icon on a display screen of the first machine; and (B) operating the first machine to transfer the constraint descriptor together with the graphical image icon to a second machine; the second machine being capable of using the constraint descriptor by clicking on the image icon to access documents from a database machine that satisfy the set of one or more constraints, the first and second machines being client machines, the constraint descriptor being encoded in a data packet having a format that provides for the data packet to be transferred between the first and second machines using one or more of infrared communication technique, wireless communication technique and low bandwidth communication technique.

2. The method of claim 1 in which the first machine includes user interface circuitry for receiving user signals and in which (A) comprises:

(A1) receiving a series of one or more user signals through the user interface circuitry, the series of user signals defining at least one relation between a document related attribute and a set of at least one value of the attribute; and (A2) using the series of user signals to compile a constraint that includes the relations defined by the series of user signals.

3. The method of claim 2 in which the series of user signals includes two or more user signals.

4. The method of claim 2 in which the first machine is a portable computing device and the user interface circuitry includes a touchscreen or a keyboard.

5. The method of claim 2 in which the first machine is a fixed computing device and the user interface circuitry includes one or more of a touchscreen, a keyboard, and a mouse.

6. The method of claim 2 in which the first machine is a multifunction device, in which the user interface circuitry includes a scanner, and in which (A1) comprises:

scanning at least a part of an image-bearing portable medium to produce electronic signals; and using the electronic signals to obtain the series of one or more user signals.

7. The method of claim 6 in which the medium is a form that includes one or more fields, at least one of the fields having a human readable indication of an attribute and an area that a user can mark to indicate a set of at least one value of the attribute.

8. The method of claim 2 in which the user interface circuitry includes display circuitry for presenting images to a user and selection circuitry the user can operate to provide signals indicating graphical objects in images presented by the display circuitry, in which the first machine includes memory in which the constraint descriptor is stored, and in which (A1) comprises:

presenting an image through the display circuitry that includes a graphical object representing the constraint descriptor;

receiving a user signal from the selection circuitry indicating the graphical object; and in response to the user signal, obtaining the stored constraint descriptor.

9. The method of claim 1 in which the first machine includes user interface circuitry for receiving user signals and in which (B) comprises:

receiving a user signal through the user interface circuitry requesting that the constraint descriptor be sent to the second machine;

encoding the constraint descriptor in the data packet; and transmitting the data packet to the second machine.

10. A method for transferring information about documents between machines, the method comprising:

(C) operating a second machine to receive a data packet from a first machine; the data packet including an encoding of a constraint descriptor; the constraint descriptor comprising one or more feature constraints defining logically-connected information about a set of one or more constraints that documents can satisfy; and (D) operating the second machine to decode the data packet to obtain the constraint descriptor; the constraint descriptor being displayed as a graphical image icon on a display screen of the first machine and the second nachine; the second machine being capable of using the constraint descriptor by clicking on the image icon to access documents from a database machine that satisfy the set of one or more constraints, the first and second machines being client machines, the data packet having a format that provides for the data packet to be transferred between the first and second machines using one or more of infrared communication technique, wireless communication technique and low bandwidth communication technique.

11. The method of claim 10 in which the second machine is connected through a network for accessing a repository of electronic documents; the method further comprising:

(E) solving the set of one or more constraints to obtain a solution and using the solution to obtain one or more document references, each document reference indicating an electronic document in the repository that satisfies a first constraint.

12. The method of claim 11 in which the second machine includes user interface circuitry; the user interface circuitry including display circuitry for presenting images to a user and selection circuitry the user can operate to provide signals indicating items in images presented by the display circuitry; the method further comprising:

(F) presenting an image through the display circuitry that includes, for each document reference, an item representing the document reference;

(G) receiving a user signal through the selection circuitry indicating a first item representing one of the document references; and (H) in response to the user signal, retrieving from the repository the electronic document indicated by the first item's document reference.

13. The method of claim 12 in which (H) comprises:

presenting a portion of the electronic document through the display circuitry.

14. The method of claim 12 in which the second machine further includes printing circuitry and in which (H) comprises:

operating the printing circuitry to print the electronic document.

15. A machine for transferring information about documents to other machines, the machine comprising:

a processor;

communicating circuitry for providing communication between the processor and other machines; and image presentation circuitry;

the processor operating to:

obtain a constraint descriptor; the constraint descriptor comprising one or more feature constraints defining logically-connected information about a set of one or more constrain s that documents can satisfy, the image presentation circuitry presenting a graphical image icon representation of the constraint descriptor; and transfer the constraint descriptor together with the image icon to one of the other machines through the communicating circuitry; the other machine being capable of using the constraint descriptor by clicking on the image icon to access documents from a database machine that satisfy the set of one or more constraints, the first machine and the other machine being client machines;

the constraint descriptor being encoded in a data packet having a format that provides for the data packet to be transferred between the machine and the other machines using one or more of infrared communication technique, wireless communication technique and low bandwidth communication technique.

16. The machine of claim 15 in which the machine is a portable computing device; the machine further comprising:

user interface circuitry connected for providing user signals to the processor;

the processor operating to obtain the constraint descriptor and to transfer the constraint descriptor in response to a user signal from the user interface circuitry.

17. The machine of claim 15 in which the machine is a fixed computing device and in which the other machine is a repository of electronic documents that includes one or more documents that satisfy the set of one or more constraints, the other machine responding to the constraint descriptor by providing one or more document references, each document reference indicating an electronic document in the repository that satisfies the set of one or more constraints; the machine further comprising:

image presentation circuitry for presenting an image that includes representations of the document references.

18. A machine for receiving information about documents transferred from other machines, the machine comprising;

a processor;

communicating circuitry for providing communication between the processor to other machines; and image presentation circuitry;

the processor operating to:

receive a data packet from one of the other machines through the communicating circuitry; the data packet including an encoding of a constraint descriptor; the constraint descriptor comprising one or more feature constraints defining logically-connected information about a set of one or more constraints that can be used to access documents on a database machine; and decode the data packet to obtain the constraint descriptor, the image presentation circuitry presenting a graphical image icon representation of the constraint descriptor, performing a query search according to the constraint descriptor by clicking the image icon, the data packet having a format that provides for the data packet to be transferred between the machine and one of the other machines using one or more of infrared communication technique, wireless communication technique and low bandwidth communication technique;

the first machine and one of the other machine being client machines.

19. The machine of claim 18 in which the machine is a portable computing device; the machine further comprising:

user interface circuitry connected for providing user signals to the processor; the user interface circuitry including display circuitry for presenting images to a user and selection circuitry the user can operate to provide signals indicating items in images presented by the display circuitry; and memory for storing data;

the processor further operating to:

store the constraint descriptor in the memory;

present an image through the display circuitry that includes an item representing the stored constraint descriptor;

receive a user signal through the selection circuitry indicating the item representing the constraint descriptor; and in response to the user signal, retrieve the stored constraint descriptor, solve the set of one or more constraints to obtain a solution, and use the solution to obtain one or more document references, each document reference indicating a document that satisfies the set of one or more constraints.

20. The machine of claim 18 in which the machine is a fixed computing device; the machine further comprising:

user interface circuitry connected for providing user signals to the processor; the user interface circuitry including display circuitry for presenting images to a user and selection circuitry the user can operate to provide signals indicating items in images presented by the display circuitry;

the processor further operating to:

solve the set of one or more constrains indicated by the constraint descriptor to obtain a solution and use the solution to obtain one or more document references, each document reference indicating an electronic document that satisfies a first constraint;

present an image through the display circuitry that includes, for each document reference, an item representing the document reference;

receive a user signal through the selection circuitry indicating an item representing a selected one of the document references; and in response to the user signal, access the selected document reference.

* * * * *